Oct. 19, 1937. V. J. HILL, JR Re. 20,535

VALVE FOR AERATED LIQUID VESSELS

Original Filed July 5, 1935

INVENTOR
VALENTINE J. HILL, JR.
BY Paul J. Anderson
ATTORNEY

Reissued Oct. 19, 1937

Re. 20,535

UNITED STATES PATENT OFFICE 20,535

VALVE FOR AERATED LIQUID VESSELS

Valentine J. Hill, Jr., Bloomfield, N. J., assignor to Walter Kidde Sales Company, Bloomfield, N. J., a corporation of Delaware Original No. 2,072,816, dated March 2, 1937, Serial No. 29,872, July 5, 1935. Application for reissue May 10, 1937, Serial No. 141,752

7 Claims. (Cl. 225—18)

The present invention relates to valves for vessels for holding an aerated liquid.

It more particularly relates to a valve used with a rechargeable syphon bottle which is used to aerate water with carbon dioxide. The carbon dioxide under high pressure is introduced into the bottle from a small capsule which is associated with the valve when it is desired to aerate the water. The valve will control the admission of the gas to the bottle and at the same time it serves to regulate the discharge of the aerated or charged liquid in the vessel when it is to be used.

Various constructions of valves of this type have been employed in the past but there has always been one great disadvantage attending their use. Whenever they have been used on a syphon bottle there has always been the danger that the bottle or the valve would burst or explode due to the existence of a high pressure in the vessel. The danger of the vessel bursting has been present particularly when the vessel has been made of a material which could not withstand high pressure, as for instance a glass bottle. This danger of excessive pressure may arise from various causes such as an undisclosed defect in the vessel itself, an overcharge of gas in the capsule, or the presence of too much liquid in the vessel. Obviously this is a danger which must be avoided in order to make the use of the syphon bottles safe for the ordinary consumer.

Accordingly, it is an object of this invention to prevent any bursting of the vessel.

It is a further object to provide a means in the valve which will burst and relieve the excess pressure in the bottle when the pressure rises to a predetermined point.

A further object is to provide a means which, if the vessel should contain too much liquid when the aerating medium is introduced under pressure, will allow the medium to escape without bursting the bottle.

A still further object of the invention is the provision of a disc on the valve which will burst before the vessel can burst, if the pressure in the vessel becomes excessive.

These and other objects will be apparent upon reference to the following specification of which the drawing is a part and in which like numerals of reference refer to the same parts in each of the views.

Figure 1:
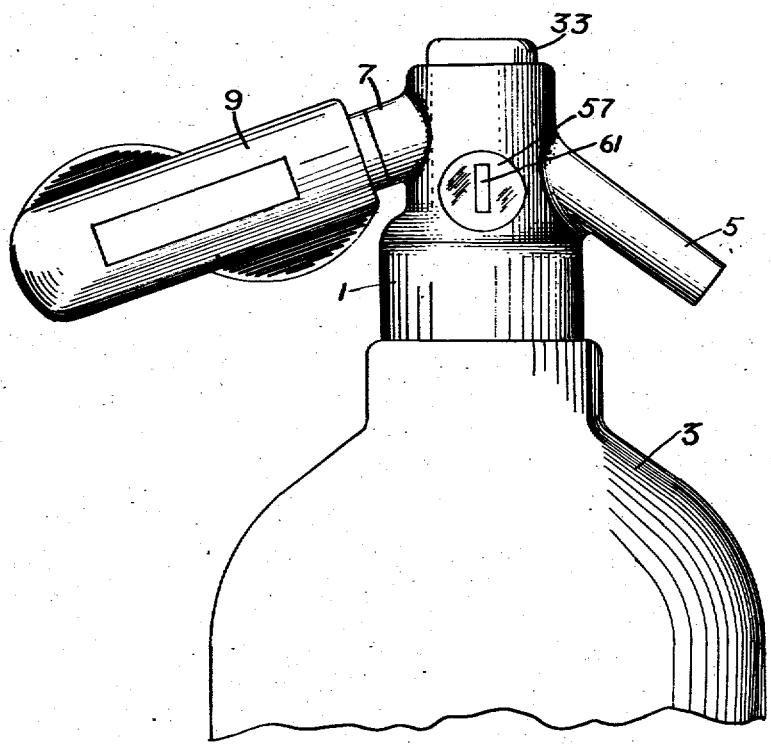
Figure 1 is an elevational view of an embodiment of the invention.

With reference to Figure 1, the valve 1 is mounted on the vessel 3 in any appropriate manner. The valve is provided with a spout 5 through which the contents of the bottle are discharged after the liquid has been aerated.

Opposite to the spout is the connection 7 to which is attached the holder 9 in which the capsule containing the fluid under pressure is placed when it is desired to aerate the liquid in the vessel 3. The details of the capsule holder and gas releasing means are not described since they form no separable part of the present invention and are well known in the art.

Figure 2:
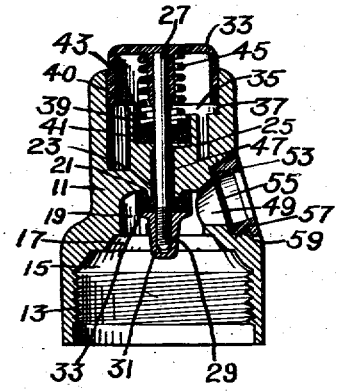
Figure 2 is a view in cross section of the valve taken on a plane through the center of the valve and at right angles to the view shown in Figure 1.

Referring to Figure 2, the valve consists of the body 11 which is provided with threads 13 by means of which the valve is attached to the vessel 3. In the body 11 is a recess 15 which is designed to overlie the top of the bottle or vessel 3. The bottle usually carries a washer which fits into the recess 17 and this insures a tight joint between the valve and the vessel. The body is also provided with a chamber 19 which is terminated at its upper end by a seat 21 surrounding a passage 23 leading from the chamber 19. There is a restricted portion 25 in the passage 23 which serves as a guide for the valve stem 27 which may be longitudinally moved in the passage.

Secured to one end of the stem 27, by the threads 29, is the valve proper 31 which carries a valve facing 33 made of rubber or some other resilient material. By using a material of this nature the contact between the valve proper and the seat is made leakage proof so that none of the excess aerating medium, over that required to aerate the liquid and which is the pressure medium employed to discharge the liquid from the vessel, can escape.

At the opposite end of the stem 27 is a push button 33 which is guided by the walls of the chamber 35 in the body 11. Formed on the wall of the chamber 35 are projections 37 which limit the downward movement of the button 33.

A recess 39 is formed in the upper surface of a portion 40 of the valve body 11 projecting within the chamber 35. A resilient rubber gasket 41 closely encompassing the valve stem 27 is received within the recess and serves to make a gas tight joint with the stem. A coiled spring 45 bears at one end against the inner surface of the push button and at the other end on a cupped washer 43 resting on the gasket 41, and encircling the valve stem 27. This spring serves to yieldingly maintain the valve proper 31 in its normally seated position and also to insure a leakage tight joint between the stem and the gasket 41.

The path of escape of the liquid is into the chamber 19 and then through the passage 23 to the spout opening 47 and out through the spout 5.

In order to prevent the bursting of the vessel upon development of an excess pressure for any reason whatever a safety device is provided comprising a frangible disc 55 and a sealing gasket 53 secured in position over the outer end of a passage 49 communicating with the chamber 19. The frangible disc may be made of a material such as "Bakelite" and adapted to burst at a pressure of approximately 200 lbs. per square inch. The capped bushing 57 which is secured in the passage 49 by the thread 59 serves to hold the frangible disc and sealing gasket in position. In the cap of the bushing 57 is provided a slot 61. The slot serves two valuable functions. It serves as a means to remove the bushing when it is desired to replace the frangible disc, by using a screw-driver, coin or other similar object as a tool. It also is the means by which the gas may be relieved into the atmosphere when the frangible disc bursts due to an excessive pressure.

The frangible disc 55 is made of some material which will rupture at a predetermined pressure. Hence, if the pressure in the bottle should rise to that pressure, the disc will rupture and allow the pressure to fall. It can thus be seen that if the rupturing pressure is carefully chosen the pressure in the bottle can never rise to a point where it would be sufficient to burst the vessel or valve head. Hence all dangers of explosion of any part of the syphon bottle and valve are entirely removed.

With the present construction the disc may be replaced very easily and the vessel may again be used with safety once the dangerous condition has been eliminated.

While the invention has been described with particular reference to its use with vessels for aerating liquids, it will of course be readily understood that the invention is equally applicable to use with vessels into which a liquid already aerated is charged, where the same danger of overcharging or of developing an excessive pressure in the vessel is encountered.

From the foregoing disclosure it will be apparent that this invention resides in certain principles of construction which may be employed in other physical forms of apparatus without departure therefrom. It is apparent, therefore, that the form of apparatus illustrated in the drawing for the purpose of disclosure has been given solely in an illustrative sense and not in any limiting sense. The scope of this invention is best defined by the appended claims.

I claim:

1. A valve adapted for use with a vessel for aerating a liquid comprising a valve body, a chamber in the body, a discharge passage communicating therewith, a spout associated with the passage, a valve proper normally sealing the passage from the chamber, a stem in the passage associated with the valve proper, a second chamber in the valve body, a button in the second chamber associated with the stem, a recess in the valve body in the second chamber, a gasket in the recess surrounding the stem, a cupped washer resting on the gasket, a spring in the second chamber surrounding the stem and bearing on the button and the cupped washer to thereby maintain the passage closed, a relief outlet communicating with the first chamber, a frangible disc in the relief outlet, a capped bushing in the relief outlet, and a slotted opening in the capped bushing to permit direct communication between the vessel and the atmosphere upon rupture of the frangible disc.

2. A valve adapted for use with a vessel for aerating a liquid comprising a valve body provided with a chamber, a discharge passage communicating therewith, a spout associated with the passage, a valve proper normally closing off the passage from the chamber, a stem in the passage associated with the valve proper, means on the valve stem adapted to be depressed to open the valve proper, a spring encompassing the stem and bearing on the last named means and the valve body to yieldingly maintain the valve proper normally closed, a relief outlet in the valve body communicating with the chamber and terminating in a seat, a sealing gasket and a frangible disc adapted to rest on said seat and overlie said relief outlet, means to secure the sealing gasket and frangible disc on said seat, and a passage in the last named means to permit relief of the pressure in the vessel when it is sufficient to rupture the frangible disc.

3. A valve and charger assembly for use with a vessel for aerating a liquid comprising a valve body provided with a chamber, a discharge passage communicating therewith, a spout associated with the passage, a valve proper normally closing off the passage from the chamber, a stem in the passage associated with the valve proper, means on the valve stem adapted to be depressed to open the valve proper, a spring encompassing the stem and bearing on the last named means and the valve body to yieldingly maintain the valve proper normally closed, a charging passage in the valve body communicating with the chamber, a charging capsule holder adapted to receive a charging capsule and to engage the valve body to secure the charging capsule to the charging passage, a relief outlet in the valve body communicating with the chamber and terminating in a seat, a sealing gasket and a frangible disc adapted to rest on said seat and overlie said relief outlet, means to secure the sealing gasket and frangible disc on said seat, and a passage in the last named means to permit relief of the pressure in the vessel when it is sufficient to rupture the frangible disc.

4. A valve adapted for use with a vessel for aerating a liquid comprising a valve body, a chamber in the body, a safety relief outlet in the valve body communicating with the chamber and terminating in a seat, a sealing gasket and a frangible disc adapted to rest on said seat and overlie said relief outlet, a capped threaded bushing to removably secure the sealing gasket and frangible disc on said seat, and a slot in the bushing to permit relief of pressure when the frangible disc bursts, said slot being adapted to receive a flat object like a coin for enabling the bushing to be moved with respect to the seat.

5. A valve adapted for use with a vessel for holding an aerated liquid comprising a valve body, a chamber in the body, a discharge passage communicating therewith, a spout associated with the passage, a valve proper normally sealing the passage from the chamber, a stem in the passage associated with the valve proper, a second chamber in the valve body, a button in the second chamber associated with the stem, a recess in the valve body in the second chamber, a gasket in the recess surrounding the stem, a cupped washer resting on the gasket, a spring in the second chamber surrounding the stem and bearing on the button and the cupped washer to thereby maintain the passage closed, a relief outlet communicating with the first chamber, a frangible disc in the relief outlet, a capped bushing in the relief outlet, and a slotted opening in the capped bushing to permit direct communication between the vessel and the atmosphere upon rupture of the frangible disc.

6. A valve adapted for use with a vessel for holding an aerated liquid comprising a valve body provided with a chamber, a discharge passage communicating therewith, a spout associated with the passage, a valve proper normally closing off the passage from the chamber, a stem in the passage associated with the valve proper, means on the valve stem adapted to be depressed to open the valve proper, a spring encompassing the stem and bearing on the last named means and the valve body to yieldingly maintain the valve proper normally closed, a relief outlet in the valve body communicating with the chamber and terminating in a seat, a sealing gasket and a frangible disc adapted to rest on said seat and overlie said relief outlet, means to secure the sealing gasket and frangible disc on said seat, and a passage in the last named means to permit relief of the pressure in the vessel when it is sufficient to rupture the frangible disc.

7. A valve adapted for use with a vessel for holding an aerated liquid comprising a valve body, a chamber in the body, a safety relief outlet in the valve body communicating with the chamber and terminating in a seat, a sealing gasket and a frangible disc adapted to rest on said seat and overlie said relief outlet, a capped threaded bushing to removably secure the sealing gasket and frangible disc on said seat, and a slot in the bushing to permit relief of pressure when the frangible disc bursts, said slot being adapted to receive a flat object like a coin for enabling the bushing to be moved with respect to the seat.

VALENTINE J. HILL, JR.